UNITED STATES PATENT OFFICE.

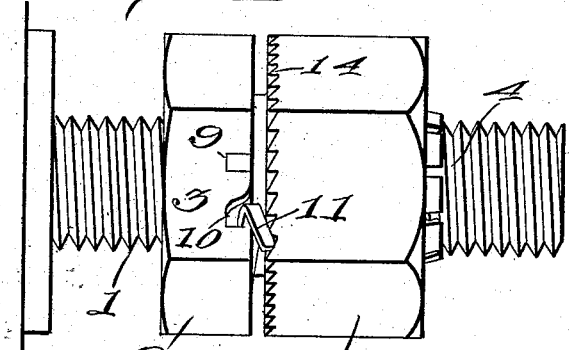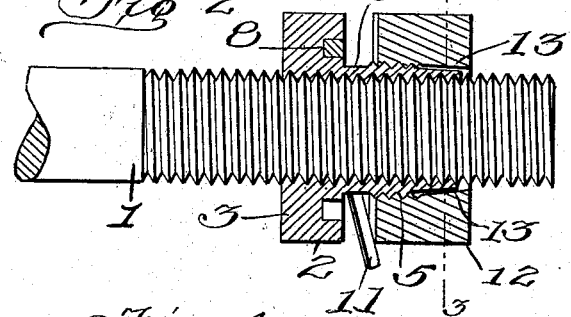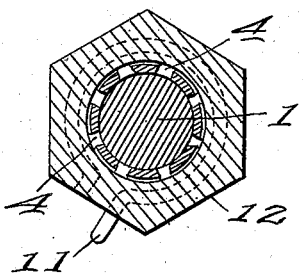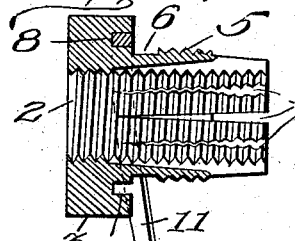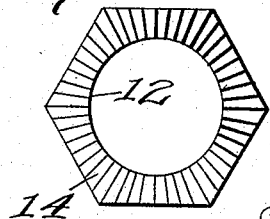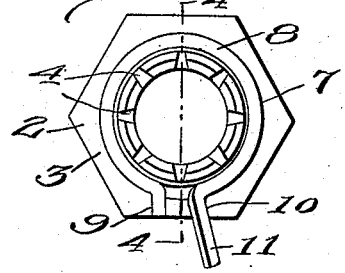

ANDREW H. DE GROFF AND ANDREW A. CUMMINGS, OF LITTLE GENESEE, NEW YORK.

NUT-LOCK.

No. 905,294.          Specification of Letters Patent.          Patented Dec. 1, 1908.

Application filed March 21, 1908. Serial No. 422,492.

*To all whom it may concern:*

Be it known that we, ANDREW H. DE GROFF and ANDREW A. CUMMINGS, citizens of the United States, residing at Little Genesee, in the county of Allegany and State of New York, have invented certain new and useful Improvements in Nut-Locks, of which the following is a specification.

This invention has for its object a simple, durable and efficient construction of nut lock, the parts of which are so arranged as to securely hold the nut upon the bolt, against the work, and capable of effectually withstanding jarring and other strains, and the invention consists in certain constructions and arrangements of the parts that we will hereinafter fully describe and claim.

For a full understanding of the invention, reference is to be had to the following description and accompanying drawings, in which:

Figure 1 is a side elevation of a nut lock embodying the improvements of our invention; Fig. 2 is a longitudinal section thereof; Fig. 3 is a transverse sectional view on the line 3—3 of Fig. 2; Fig. 4 is a sectional view of the nut on the line 4—4 of Fig. 5; Fig. 5 is an end view of the nut; and, Fig. 6 is a face view of the washer.

Corresponding and like parts are referred to in the following description and indicated in all the views of the drawings by the same reference characters.

Referring to the drawing, the numeral 1 designates a bolt and 2 our improved nut which is interiorly threaded to engage the threads of the bolt. The head 3 of the nut 2 is polygonal as shown, so as to be readily engaged by a wrench or other tool to turn the nut up against the work, and the outer end of the nut is formed with a plurality of longitudinally extending slits 4 forming a series of jaws designed to be sprung into firm engagement with the bolt to prevent the nut from backing off. Preferably the jaws are reamed out as indicated in Fig. 4, in order to secure an increased resiliency. The nut 2 is provided with exterior threads 5, as shown, said threads terminating short of the head 3 so as to leave an annular smooth portion 6, as clearly illustrated in the drawing. The head 3 is formed contiguous to this smooth portion 6, with an annular recess 7 in which a split spring ring 8 is designed to fit, one end of said spring being securely held in a notch 9 formed in the head 3, as shown. The said head is also formed near the notch 9 with a socket 10 designed under certain conditions to receive the free and outwardly extending latch end 11 of the spring.

12 designates a washer which is interiorly threaded to work on the exteriorly threaded portion 5 of the nut 2 and the bore of which is tapered at its outer end as indicated at 13, so as to effectually engage the spring jaws formed by the slits 4 and bind them against the bolt when the washer has been screwed up on the nut. The washer 12 is formed with a serrated face 14 designed for engagement with the outwardly extending latch end 11 of the spring 8 so as to hold the washer in place and to prevent any backing-off of the same after the washer has been screwed up on the nut.

In the practical application or use of our improved nut lock, the nut 2 is screwed up tightly against the work on the bolt 1 and the washer 12 is then screwed up tightly on the nut, which operation compresses the spring tongues of the nut and forces them positively against the threads of the bolt, while the latch end 11 of the spring snaps along the inclined serrations of the face 14 of the washer, while the same is being screwed on and effectually holds the washer in place at the completion of the operation.

While it is clear from the foregoing description, in connection with the accompanying drawing, that the spring 8 will prevent the washer from backing-off and thereby serving to lock the washer and nut securely together with the spring jaws of the latter in firm engagement with the bolt, thereby preventing any accidental unscrewing of either the washer or nut, the nut may be easily unscrewed whenever desired, by merely pressing the outwardly projecting latch end of the spring towards or into the socket 10, which will free the spring from the serrated face 14 of the washer and permit the washer to be first unscrewed after which, manifestly, the nut also may be backed off.

Having thus described the invention, what is claimed as new is:

1. A nut of the character described, provided with a head, a longitudinally slitted outer end and with exterior threads terminating short of the head, a washer adapted to screw on said threads and compress the slitted end of the nut, and a spring secured to said nut and normally lying in the space between the threads and the head thereof, and arranged for locking engagement with the washer.

2. A nut of the character described, provided with a head, and a longitudinally slitted outer end and also provided with exterior threads, the head being formed in its outer face with an annular recess, a washer adapted to screw on the exterior threads of the nut and arranged to compress the slitted end thereof, said washer being formed with a serrated face, and a spring secured at one end within the recess, the other end of said spring being adapted to spring out from the recess into locking engagement with the serrated face of the washer.

3. A nut of the character described, provided with a head, a longitudinally slitted outer end, and exterior threads, the head being formed with an annular recess and with a notch and a socket communicating with said recess, a spring ring received in said recess, one end of said spring being secured in said notch and the other end of said spring projecting outwardly in registry with said socket, and a washer adapted to screw on said nut and arranged to compress the slitted end thereof, the washer being formed in one face with serrations designed for engagement by the outwardly projecting end of the spring.

In testimony whereof we affix our signatures in presence of two witnesses.

ANDREW H. DE GROFF. [L. S.]
ANDREW A. CUMMINGS. [L. S.]

Witnesses:
ELMER G. BURDICK,
RALPH D. HILL.